(12) United States Patent
Bhatawdekar et al.

(10) Patent No.: US 8,606,803 B2
(45) Date of Patent: Dec. 10, 2013

(54) TRANSLATING A RELATIONAL QUERY TO A MULTIDIMENSIONAL QUERY

(75) Inventors: Ameya Bhatawdekar, Issaquah, WA (US); Alan Hebert, Bellevue, WA (US); Karthik Subramanyam, Woodinville, WA (US); Mauli Shah, Bellevue, WA (US); Jian H. Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

(21) Appl. No.: 12/060,279

(22) Filed: Apr. 1, 2008

(65) Prior Publication Data
US 2009/0249125 A1  Oct. 1, 2009

(51) Int. Cl.
*G06F 17/30* (2006.01)
*H04L 12/58* (2006.01)

(52) U.S. Cl.
CPC ...................................... *H04L 12/58* (2013.01)
USPC ............ 707/759; 707/713; 707/736; 707/769

(58) Field of Classification Search
CPC ..................................................... H04L 12/58
USPC ..................... 707/758, 759, 705, 1, 2, 3, 100, 707/999.001, 999.002, 999.003, 999.1, 713, 707/736, 769
See application file for complete search history.

(56) References Cited

U.S. PATENT DOCUMENTS

| | | | |
|---|---|---|---|
| 6,470,333 B1 * | 10/2002 | Baclawski | 1/1 |
| 6,704,726 B1 * | 3/2004 | Amouroux | 707/999.004 |
| 7,181,440 B2 | 2/2007 | Cras et al. | |
| 7,447,687 B2 * | 11/2008 | Andersch et al. | 707/999.003 |
| 7,640,238 B2 * | 12/2009 | Mordvinov et al. | 707/999.001 |
| 7,657,516 B2 * | 2/2010 | Zaman et al. | 707/999.004 |
| 7,707,143 B2 * | 4/2010 | Bruce et al. | 707/999.003 |
| 7,707,163 B2 * | 4/2010 | Anzalone et al. | 707/999.107 |
| 7,711,704 B2 * | 5/2010 | Azizi | 707/600 |
| 7,716,167 B2 * | 5/2010 | Colossi et al. | 707/714 |
| 7,895,191 B2 * | 2/2011 | Colossi et al. | 707/717 |
| 2003/0115194 A1 | 6/2003 | Pitts et al. | |
| 2004/0122646 A1 * | 6/2004 | Colossi et al. | 703/22 |
| 2004/0236767 A1 | 11/2004 | Soylemez et al. | |
| 2005/0010565 A1 | 1/2005 | Cushing et al. | |
| 2006/0253414 A1 | 11/2006 | Mittal et al. | |

(Continued)

OTHER PUBLICATIONS

Bastien., "Accessing multidimensional Data Types in Oracle 9i Release 2", Journal: Design and Management of Data Warehouses. Date 2003. pp. 1-8.

(Continued)

*Primary Examiner* — Dangelino Gortayo
(74) *Attorney, Agent, or Firm* — Microsoft Corporation

(57) ABSTRACT

Data stored in relational databases can be retrieved using a relational database query language, while data stored in a multidimensional database is typically retrieved using a multidimensional database query language. However, most users do not have a functional working knowledge of multidimensional database query languages, which leaves large amounts of data inaccessible. Further, while some relational database query languages may be translated into a multidimensional database language, the information generated by such translations is often unusable, or returns large numbers of errors. In order to obtain effective translation of a relational database query language to a multidimensional database query language effective translation and filtering needs to occur. Using effective mapping and retrieval of database metadata along with effective, customizable business logic filtering of query components, more effective and reliable results may be achieved.

20 Claims, 8 Drawing Sheets

(56) References Cited

U.S. PATENT DOCUMENTS

2006/0294087 A1* 12/2006 Mordvinov ............... 707/4
2007/0027904 A1* 2/2007 Chow et al. ............. 707/102
2007/0061291 A1 3/2007 Azizi
2007/0208721 A1 9/2007 Zaman et al.
2008/0021915 A1* 1/2008 Bakalash et al. ........ 707/101
2010/0017395 A1* 1/2010 Wayn et al. ............... 707/5

OTHER PUBLICATIONS

Cabibbo, et al., "A Logical Approach to Multidimensional Databases", Advances in Database Technology—EDBT'98, 6th International Conference on Extending Database Technology, Valencia, Spain, Mar. 23-27, 1998, Proceedings. pp. 183-197.

Gingras, et al., "nD-SQL: A Multi-dimensional Language for Interoperability and OLAP", Proceedings of the 24th VLDB Conference, New York, USA 1998. pp. 134-145.

Zaman, et al., "Modeling and Querying Multidimensional Data Sources in Siebel Analytics: A Federated Relational System", SIGMOD 2005, Jun. 14-16, 2005, Baltimore, Maryland, USA. pp. 822-827.

* cited by examiner

TRANSLATING A RELATIONAL QUERY TO A MULTIDIMENSIONAL QUERY

BACKGROUND

In a computing environment, data can be stored in databases with different storage schema. A relational database stores data in tables, which is a collection of relations, with schema that identifies relationships between columns and rows and various tables. Multidimensional databases can store data in tables, but have a high degree of flexibility in the definition of dimensions, units, and unit relationships, with data stored using schema that relates data in time as well as relationships identified by the characteristics of data. Further, each database scheme has a different language for querying against the database, for example, a relational database often uses structured query language (SQL), while a multidimensional database typically uses a multidimensional expression language (MDX).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In computing environments, data (e.g., sales, work, and production information) tracking and storage tools often include customizable collections of fields, for storing information about items of interest, in a relational database. Further, historical data stored in a relational database can be pushed to a multidimensional database (e.g., an online analytical processing cube), which is often used for data mining and reporting. In order to be useful, customizable records should have an ability to be searched by users. A common approach to searching is to have a search capability that utilizes an underlying query language of the relational database (e.g., structured query language (SQL)). Users are often asked to create relational database language queries in order to search and retrieve information of interest to a user. However, in order to query a multidimensional database a different query language is provided (e.g., multidimensional expressions language (MDX)) than that of a relational database.

Because most database users either have a working knowledge of the relational database query language or programs they use employ a relational database query language to generate reports from database, it would be desirable to have a way to translate relational database queries into relevant multidimensional queries.

As provided herein, a technique and system for querying a multidimensional database using a relational database query language (e.g., SQL); such that the relational database queries may be translated into relevant multidimensional database language queries (e.g., MDX). The techniques and systems identify individual components, for example, of an SQL query, and then sends them through a business logic filter. In this example, the business logic filter applies rules that eliminate certain SQL fields that cannot be effectively translated into MDX queries. Further, the amount of data retrieved can be trimmed and data ranges recognized using a customizable process.

Once business logic filtering has been applied, for example, respective metadata for the SQL query components and work item query language (WIQL) can be looked up in a metadata store, and corresponding MDX query component metadata can be retrieved from the metadata store. In this example, with the MDX query component metadata identified, respective MDX query components can be generated and arranged into respective MDX queries. Further, sets of MDX queries can be generated for current snapshot data, and sets of MDX queries for historical trend data can be generated. The MDX queries can be submitted to a multidimensional database to retrieve data corresponding to the SQL query submitted by the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
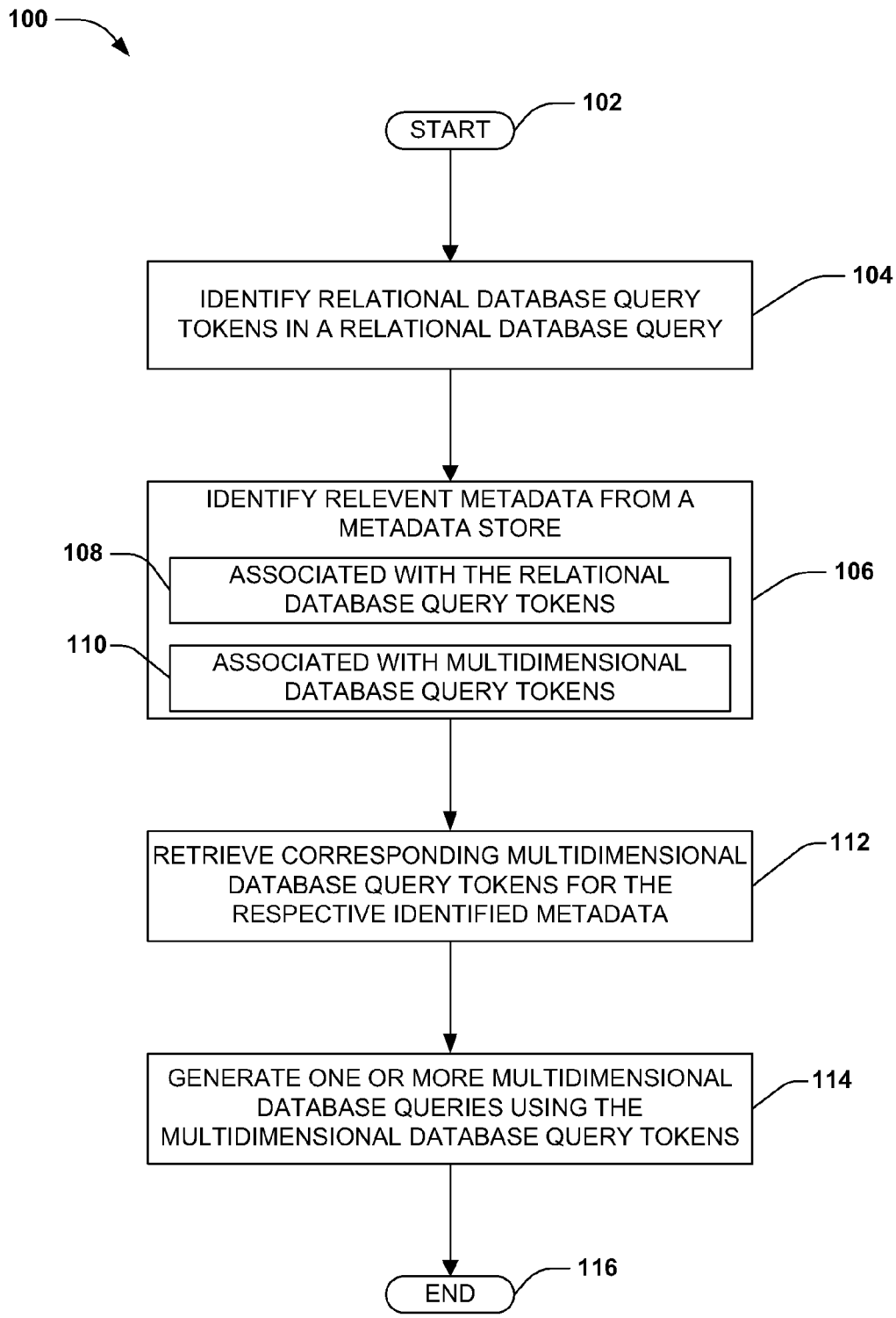
FIG. 1 is a flow diagram illustrating an exemplary method for generating multidimensional database queries from relational database queries.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In computing environments, few database users have a functional working knowledge of a multidimensional database language (e.g., MDX). This leaves users of multidimensional databases with a few options for performing data mining and reporting in a multidimensional database. A user could hire someone proficient in a multidimensional database language or hire a service for performing necessary operations; although this may be too expensive for a user. A user could utilize "out-of-the-box" reporting tools that may come with the purchase of a multidimensional database system; although this often limits the user's reporting ability to that provided by the "out-of-the-box" tools, or the user may abandon the multidimensional database system entirely. A user may elicit a relational database language query (e.g., SQL) to multidimensional language query (e.g., MDX) translator for mining and reporting. However, current translators may not properly account for situations where portions of the relational database language query cannot be properly translated into a multidimensional language query, or where the relational database language query will not return "meaningful" information from the multidimensional database. Therefore, it may be desirable for a user to have the ability to translate a relational database language query into a multidimensional language query that will return results that are meaningful to the user and account for situations where the relational database language query cannot be properly translated into a multidimensional language query.

Embodiments described herein relate to techniques and systems for querying a multidimensional database using a relational database query language (e.g., SQL), such that the relational database queries may be translated into relevant multidimensional database language queries (e.g., MDX).

In FIG. 1 an exemplary method 100 begins at 102 and involves identifying relational database query tokens in a relational database query at 104. After the tokens are identified, relevant metadata is identified from a metadata store at 106, for metadata associated with the relational database tokens at 108, and for metadata associated with multidimensional database query tokens at 110. After relevant metadata has been identified, corresponding multidimensional database query tokens are retrieved for the respective identified metadata at 112. Having retrieved the multidimensional database query tokens, one or more multidimensional database queries are generated using the multidimensional database query tokens at 114. After the one or more multidimensional database queries are generated the exemplary method 100 ends at 116.

In one embodiment of the method described above, relational database queries may be parsed into respective components (e.g., fields) that make up the relational database query. Respective components can be identified and grouped into "buckets" that correspond to query component identities, or query "tokens" (e.g., operators, filter criteria, filter fields, and results fields). After the respective relational database query tokens have been identified and grouped, business logic filtering may be applied to the relational database query tokens, which can determine whether the respective tokens can effectively be translated into a corresponding multidimensional database language query (e.g., will the token used in the relational database query translate into a usable multidimensional database query), or whether the respective tokens will provide useful information when translated into a multidimensional database query (e.g., data trimming to target the most meaningful data based on a customizable process guidance). Further, the business logic filter may translate the relational database query tokens into work item queries (e.g., utilizing work item query language (WIQL)).

Information associated with the business logic filtered relational database query tokens and work item queries can be used to identify metadata (e.g., schema metadata in an XML file), stored in a metadata store (e.g., metadata can be generated, continually updated, and stored during creation and use of a relational database that utilizes a multidimensional database for storing historical data), and corresponding multidimensional database metadata can be identified from the metadata store. Using the corresponding multidimensional database metadata, a list of multidimensional database tokens (e.g., filter criteria for a subset of fields that form a filter clause, filter values and a subset of fields to be returned in a query result) that correspond to the relational database query tokens can be retrieved. The retrieved multidimensional database tokens, and respective relationships, can be used to generate sets of multidimensional database queries. One set of multidimensional database queries may be generated to retrieve current data (e.g., a current snapshot at the time of a query), while a second set of multidimensional database queries may be generated to retrieve historical data (e.g., a trend snapshot prior to the time of a query). In this embodiment, resulting multidimensional database queries may be used by a multidimensional database management system (e.g., online analytical processing (OLAP) cube) to extract meaningful data from a data warehouse and display the data to a user.

Figure 2:
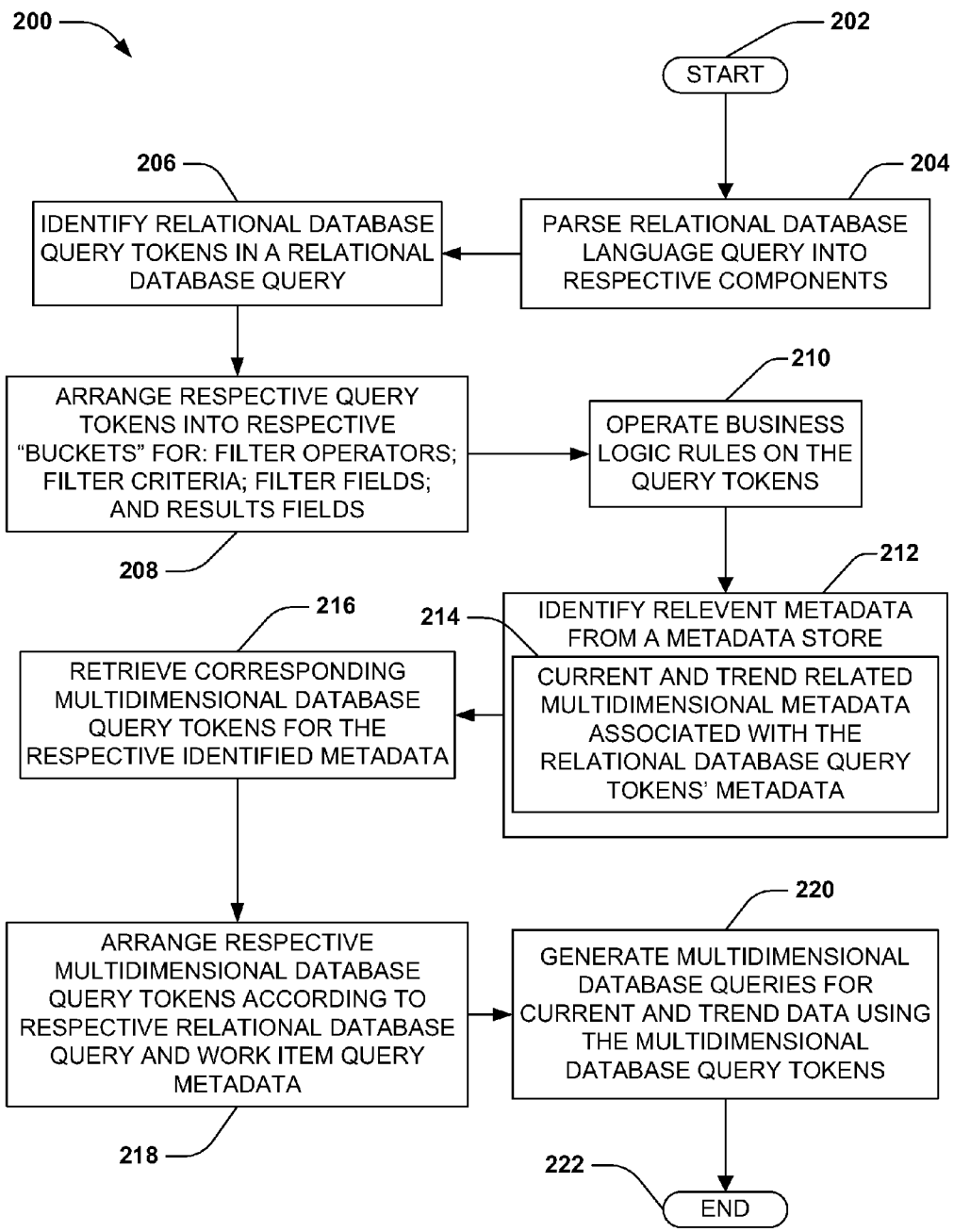
FIG. 2 is a flow diagram illustrating another exemplary embodiment of a method for generating multidimensional database queries from relational database queries.

One example of this embodiment is shown in FIG. 2. In FIG. 2 an exemplary method 200 begins at 202 and involves parsing a relational database language query into its respective components at 204. At 206 relational database language query tokens are identified, then arranged into respective "buckets" containing: filter operators; filter criteria; filter fields; and results fields at 208. At 210 business logic rules are operated upon the relational database query tokens. At 212 relevant metadata is identified from a metadata store, for current and trend related multidimensional metadata associated with the relational database query tokens' metadata at 214. After the metadata has been identified, corresponding multidimensional database query tokens are retrieved for the respective identified metadata at 216. At 218, the respective multidimensional database query tokens are arranged according to the respective relational database query metadata (e.g., filter operators; filter criteria; filter fields; and results fields) and work item query metadata. After the respective multidimensional database query tokens have been arranged, sets of multidimensional database a queries for trend/historical information and for current information are generated using the multidimensional database query tokens at 220. Having generated the multidimensional database queries, the exemplary method 200 ends at 222.

In one aspect, business logic filtering is applied to relational database queries prior to translating them into multidimensional database queries. This business logic filtering helps make resulting multidimensional database queries more meaningful and the resulting data from a query more useful to a user. The business logic filtering is configured to look at filters and operators used in a relational database query and determine whether they would return "useful" information against a multidimensional database. As an example, certain SQL conditions may not be effectively translated into MDX, as they may return a much larger dataset than is useful to a user, or are simply not supported by MDX. A data warehouse may have millions of rows, so if a query limit is reached, information would not be returned. Some examples of conditions filtered by the business logic filter, which may not be effectively translated from a relational query language (e.g., SQL) to a multidimensional database query language (e.g., MDX), include:

Homogenous "=" filter criteria that contains only one field on which one or more filter conditions are applied;
Heterogeneous "=" filter criteria that contains a different field to which one or more filter conditions are applied;
Heterogeneous "OR" (e.g., field1 = x or field2 = y);

-continued

Homogeneous "OR" limitations:
    A mixture of "<>" and "=" equivalents using "OR" (e.g.,
Field1 <> x OR Field1 = y OR Field1 = z; Field1 in (x, y) OR
Field1 <> z);
    A mixture of label filter and item list filters using "OR"
(e.g., Field1 = x OR Field 1 > y, with the exception of "Not
Between");
    This pattern is not supported: (Field1 = a OR Field1 = b)
AND (Field1 = c OR Field1 = d);
Homogeneous "AND" limitations:
    a mixture of "<>" and "=" equivalents or multiple "=" using
"AND" (e.g., Field1 <> x AND Field1 = y AND Field1 = z; Field1
= x AND Field1 =y).

In these examples, the business logic filter can flag an error or warning on the condition, then a user can be notified of an error or downgrade of data returned by a relational database query. Further, if the business logic filter identifies a field that does not exist in the multidimensional database, a translation engine can notify the user, or include default code that may enter a default portion of a multidimensional database query language into the translated query.

Further, the business logic filtering may translate relational database language queries (e.g., SQL) into work item queries (e.g., WIQL), due to certain complex operators used in multidimensional database queries. As an example, while SQL may be translated into MDX, the business logic filter may translate portions of an SQL query into WIQL, to account for the complex operators used by MDX. The complex operators in WIQL, which are translated from SQL, can then be translated into MDX. For example, WIQL has an "IN GROUP" clause that has a similar implementation in SQL, but is not exactly the same. The business logic filter can translate WIQL primitives to MDX primitives, ensuring that SQL to WIQL primitive mapping semantics are not altered, while allowing for use of the complex operators found in MDX.

The business logic filter may also enable data trimming to target the most meaningful data, based on a customizable user interface (e.g., Team Foundation process guidance). As an example, process guidance can provide information about data fields, how reports may be generated, and various guidelines for data ranges in reports. These guidelines may be used to customize the business logic filter so that, for example, SQL and WIQL fields are selected or translated to account for the data ranges requested in the process guidance. As an example, an iteration in a report may be defined as a 6 week period, therefore, the business logic filter may perform date-based filtering so that historical data generated by an MDX query is limited to 6 weeks. Further, a customizable process guidance designated by a user may allow for additional client-side filtering performed by the business logic filter, for example, producing only a top ten report of certain data.

In another aspect, a metadata store may contain definitions of schema, tables, relationships between tables and columns, and other information concerning how data is stored and updated in a relational database, and relationships to how the data is stored and updated when it is pushed out to a multidimensional database. For example, as data is stored and updated on a daily basis in a relational database, information on the schema of the database, tables, columns and their relationships to each other can be stored in order to allow for orderly retrieval and manipulation of the data. Further, as data is pushed from the relational database, for example, to an OLAP cube the schema of the cube can also be stored. Therefore, in this example, a metadata store can also store information on mapping between the databases in an XML file. In one embodiment, when metadata relating to relational database query tokens is identified in a metadata store, metadata relating to corresponding multidimensional database query tokens can be identified. Therefore, in this example, a list of multidimensional database query fields can be retrieved that correspond to fields in the relational database query. After a list of fields in the multidimensional database has been retrieved, which correspond to fields in the relational database query (e.g., filter criteria for a subset of fields that form a filter clause, filter values and a subset of fields to be returned in query results), information for generating an equivalent multidimensional database query is available.

In another aspect, a relational database query to multidimensional database query translation technique can generate two set of multidimensional queries. A first set of multidimensional queries can be configured to retrieve a current data snapshot (e.g., data relevant to a time of the query). A second set of multidimensional queries can be configured to retrieve an historical data trend (e.g., a trend of data within a specified period of time prior to the time of the query). The queries in the first and second sets can be complimentary, for example, where each current snapshot query has a corresponding historical trend query. Respective sets of queries may be generated from a same set of relational database query tokens; however, the historical trend query includes a date range. Therefore, the historical trend query returns data for a specified date range instead of data relevant to the time of the query. Further, for example, the date range can be customizable. The date range can be stored a configuration store, which can be modified by a user.

Figure 3:
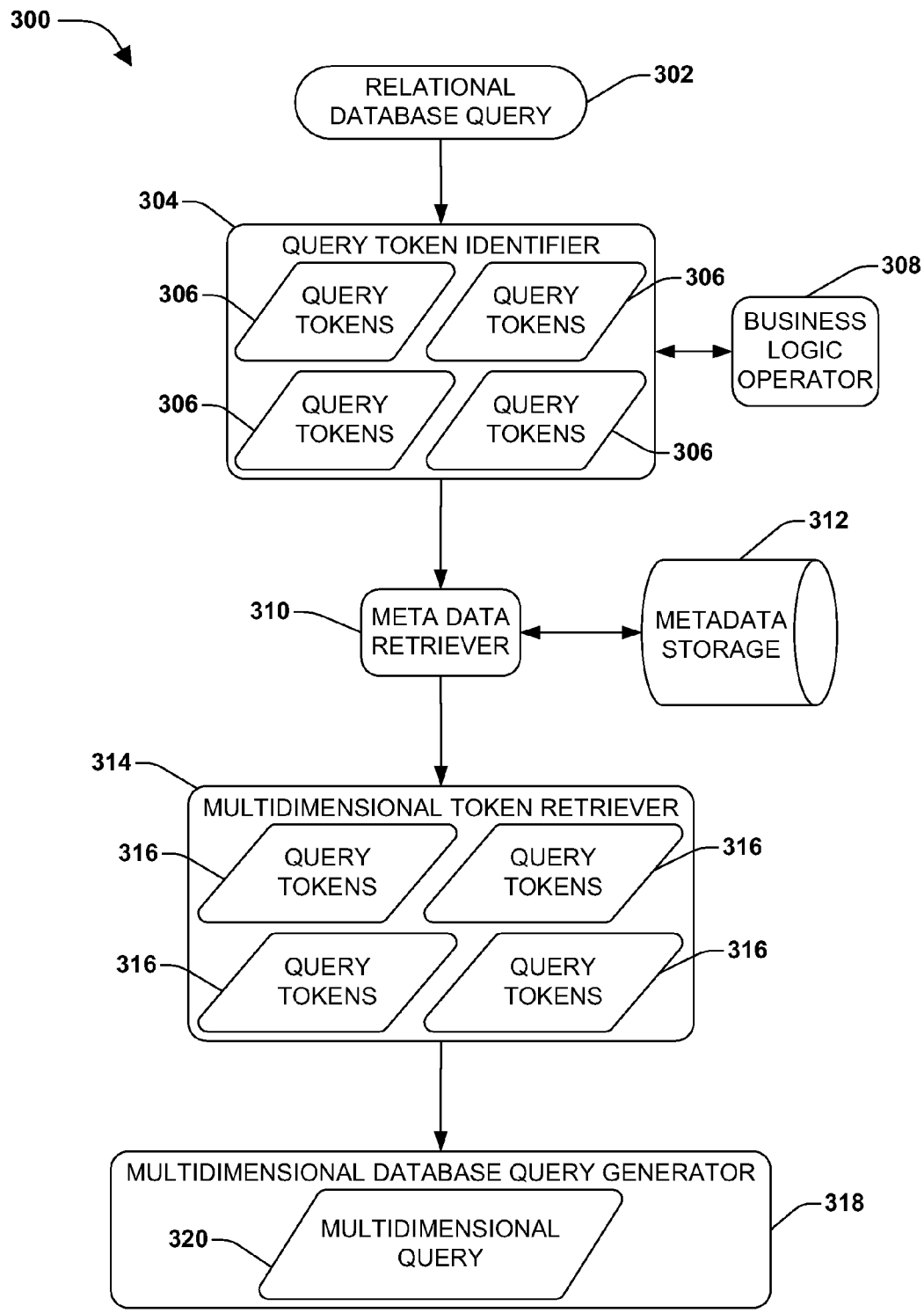
FIG. 3 is a block diagram illustrating an exemplary system for generating multidimensional database queries from relational database queries.

A system may be configured for querying a multidimensional database using a relational database query language (e.g., SQL), such that the relational database queries may be translated into relevant multidimensional database language queries (e.g., MDX). FIG. 3 is a block diagram illustrating an exemplary system 300 for translating a relational database language query into one or more relevant multidimensional database language queries. In FIG. 3 a relational database query 302 is sent to a relational database query token identifier 304. The relational database query token identifier 304 identifies respective components of the relational database query 302 and breaks the components into respective query tokens 306. A business logic operator 308 operates upon the identified query tokens 306, by applying business logic rules to determine which of the respective tokens will be able to retrieve relevant multidimensional database data. Information associated with the applicable query tokens is sent to a metadata retriever 310, which calls to a metadata storage component 312 to retrieve respective multidimensional database metadata corresponding to applicable query tokens. Information associated with multidimensional database metadata corresponding to applicable query tokens is sent to a multidimensional database query token retriever 314, which retrieves multidimensional database query tokens 316 corresponding to metadata information sent from the metadata retriever 310. Information associated with the retrieved tokens 316 are sent to a multidimensional database query generator 318, which generates one or more a multidimensional database queries 320.

Figure 4:
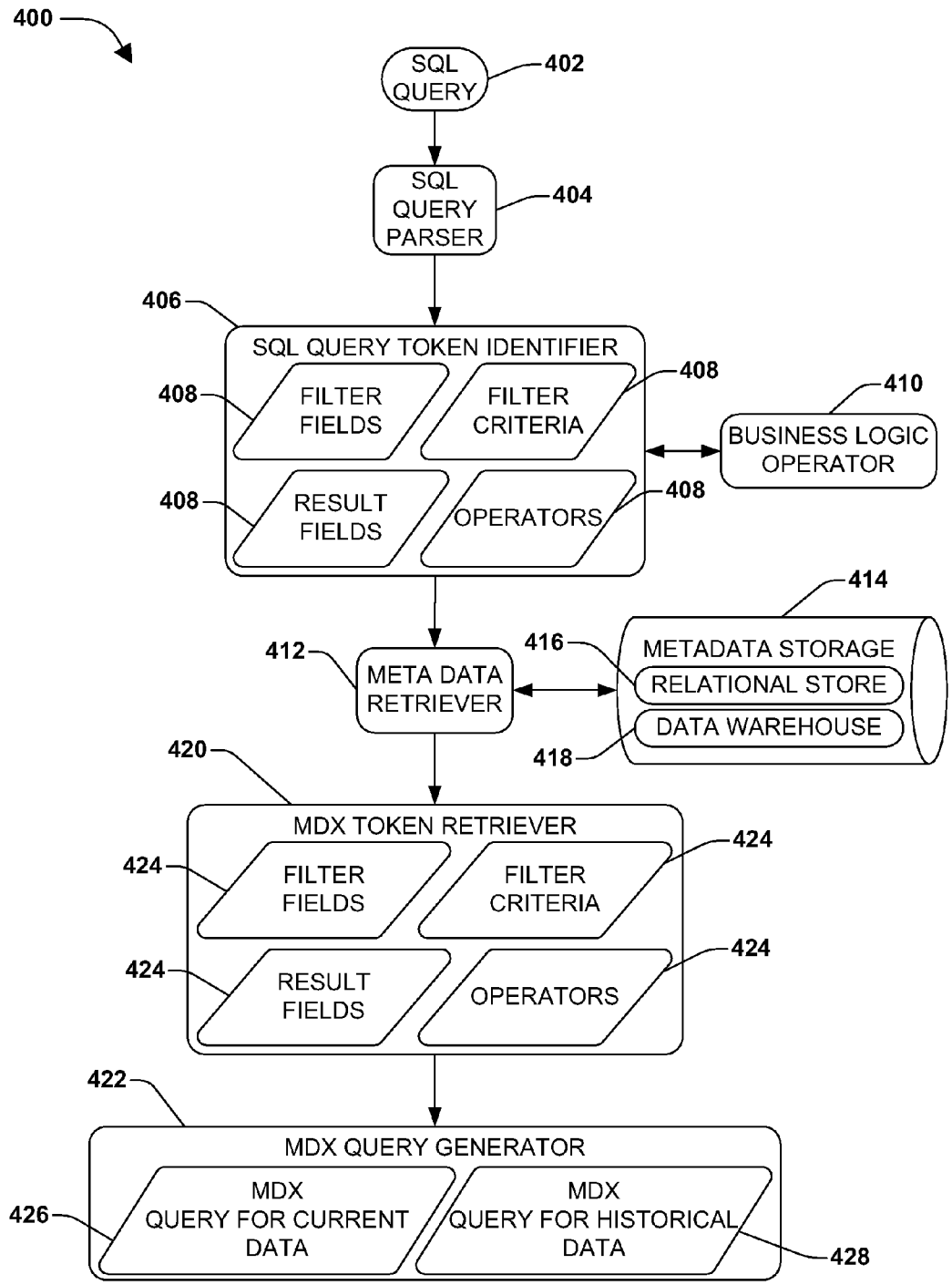
FIG. 4 is a block diagram illustrating an exemplary embodiment of a system for generating MDX queries from SQL queries.

One example of this system is illustrated by an exemplary system 400 in FIG. 4. A structured query language (SQL) query 402 is sent to a SQL query parser 404 that parses the query 402 into respective components. A SQL query token identifier receives the query components, identifies the respective components by their particular characteristics, and places each token into respective "buckets" 408 for: filter fields; filter criteria; result fields; and operators. A business logic operator 410, which also contains a work item query language (WIQL) operator, applies rules to the bucketed SQL tokens 408 from the SQL query token identifier 406. The business logic operator 410 can determine which of the SQL query tokens will produce relevant data from a multidimensional database. Information from applicable SQL tokens and WIQL query items is sent to a metadata retriever 412, which calls to a metadata storage component 414 to retrieve respective multidimensional database metadata 418 corresponding to metadata associated with the SQL tokens 416. Retrieved metadata is sent to a multidimensional expression language (MDX) token retriever 420, which retrieves corresponding MDX tokens for the respective metadata, which arranges the MDX tokens according to the respective relational database query metadata (e.g., filter operators; filter criteria; filter fields; and results fields) and work item query metadata. The arranged MDX tokens 424 are sent to a MDX query generator 422, which generates a MDX query for current data 426 from a multidimensional database, and a MDX query for historical (e.g., trend) data 428 from a multidimensional database.

Figure 5:
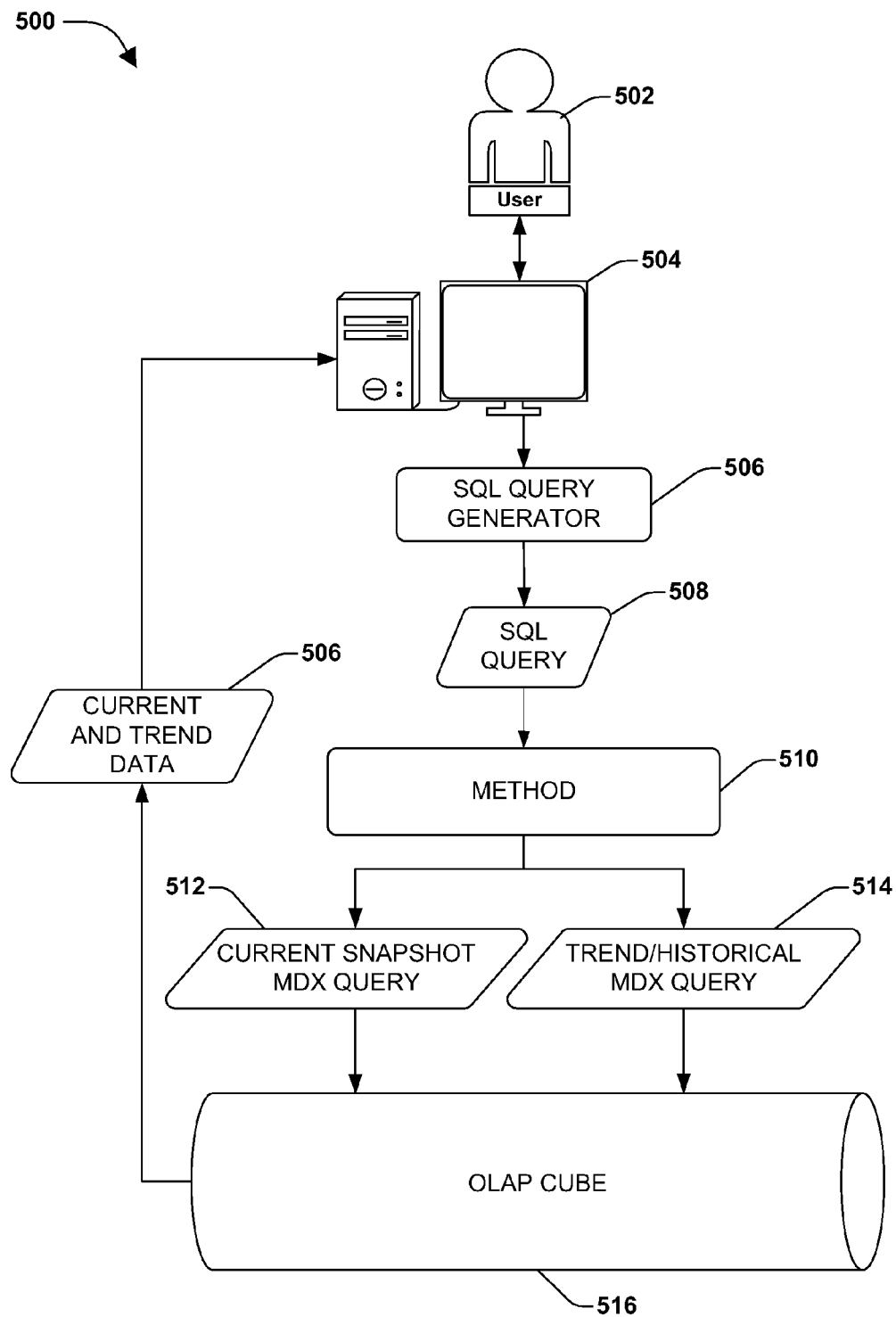
FIG. 5 is an illustration of exemplary embodiment of a method and system for querying a multidimensional database using SQL queries.

In one embodiment of the techniques and systems described herein, a user may interact with a multidimensional database through a graphical user interface (GUI) on a computer system, configured to utilize a relational database query language. As an example, the user may query the multidimensional database without knowing how to write a query in the relational database query language. In this example, a GUI may prompt the user to enter query related information, then an underlying application can generate an SQL query and forward the query to systems configured to query the multidimensional database using a SQL query language, such that the SQL query is translated into one or more relevant MDX queries. FIG. 5 illustrates an example 500 of this embodiment. A user 502 enters query criteria into a graphical user interface (GUI) on a computer system 504. The GUI sends the query criteria to a SQL generator, which generates a SQL query 508 based on the query criteria entered by the user 502. The SQL query is sent through a method 510, which generates corresponding MDX queries for current (e.g., snapshot) data 512 and historical (e.g., trend) data 514. These MDX queries are sent to the multidimensional database management system (e.g., an online analytical processing cube) 516, which processes the queries against data stored its system. Data generated by the MDX queries 506 is sent from the multidimensional database management system 516 back to the computer system 504, which displays the requested information on the GUI for the user 502 to use (e.g., see).

Figure 6:
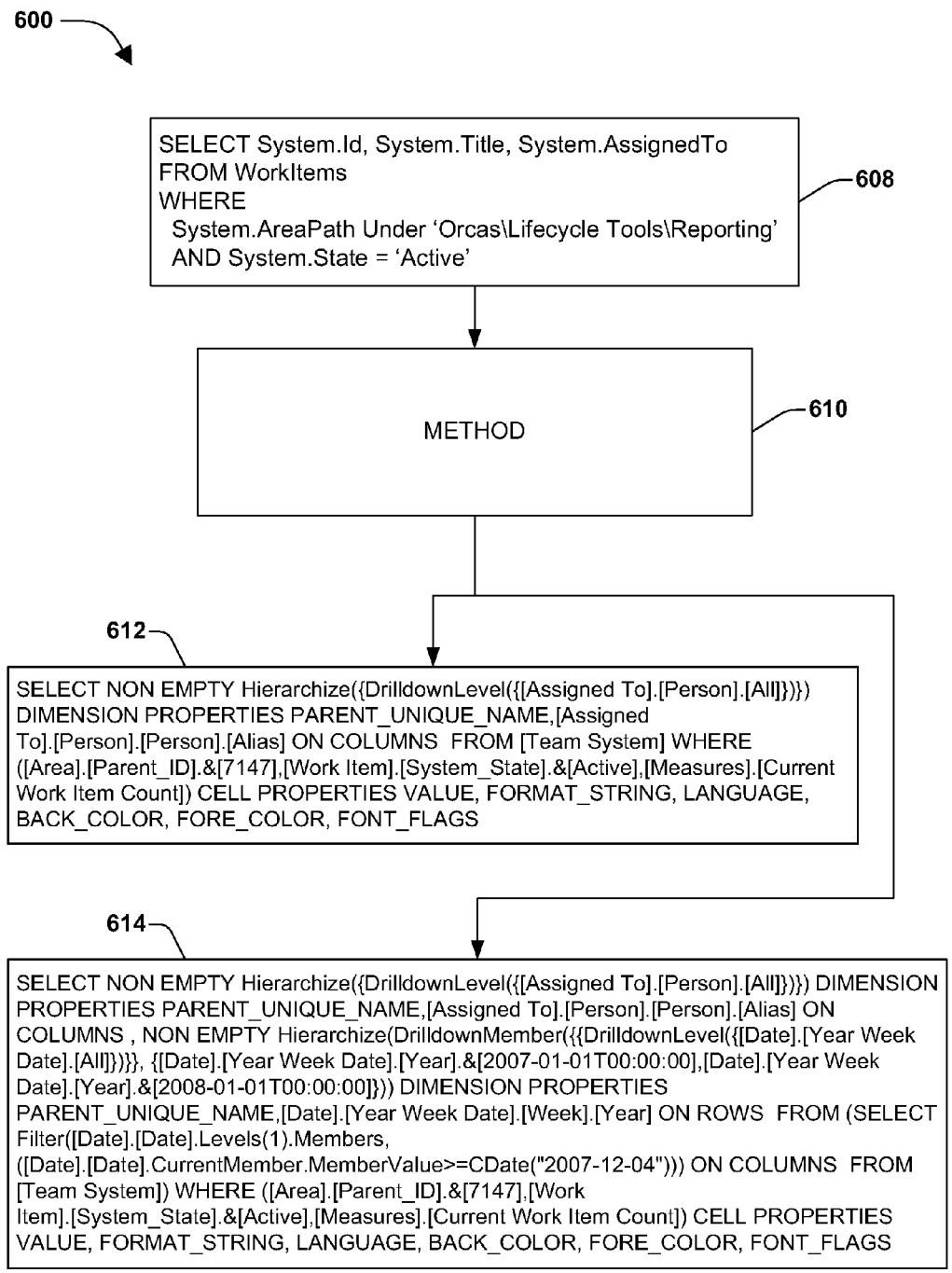
FIG. 6 is a flow chart of a detailed portion of an exemplary embodiment of a method and system for translating SQL queries into MDX queries.

FIG. 6 illustrates one example 600 of a portion of the embodiment described above, where an exemplary SQL coded query is translated into exemplary MDX coded queries, using the method described herein. An exemplary query in SQL code 608 is sent through the method 610. The method 610 generates an exemplary query in MDX code for current data 612, and an exemplary query in MDX code for historical data 614.

Figure 7:
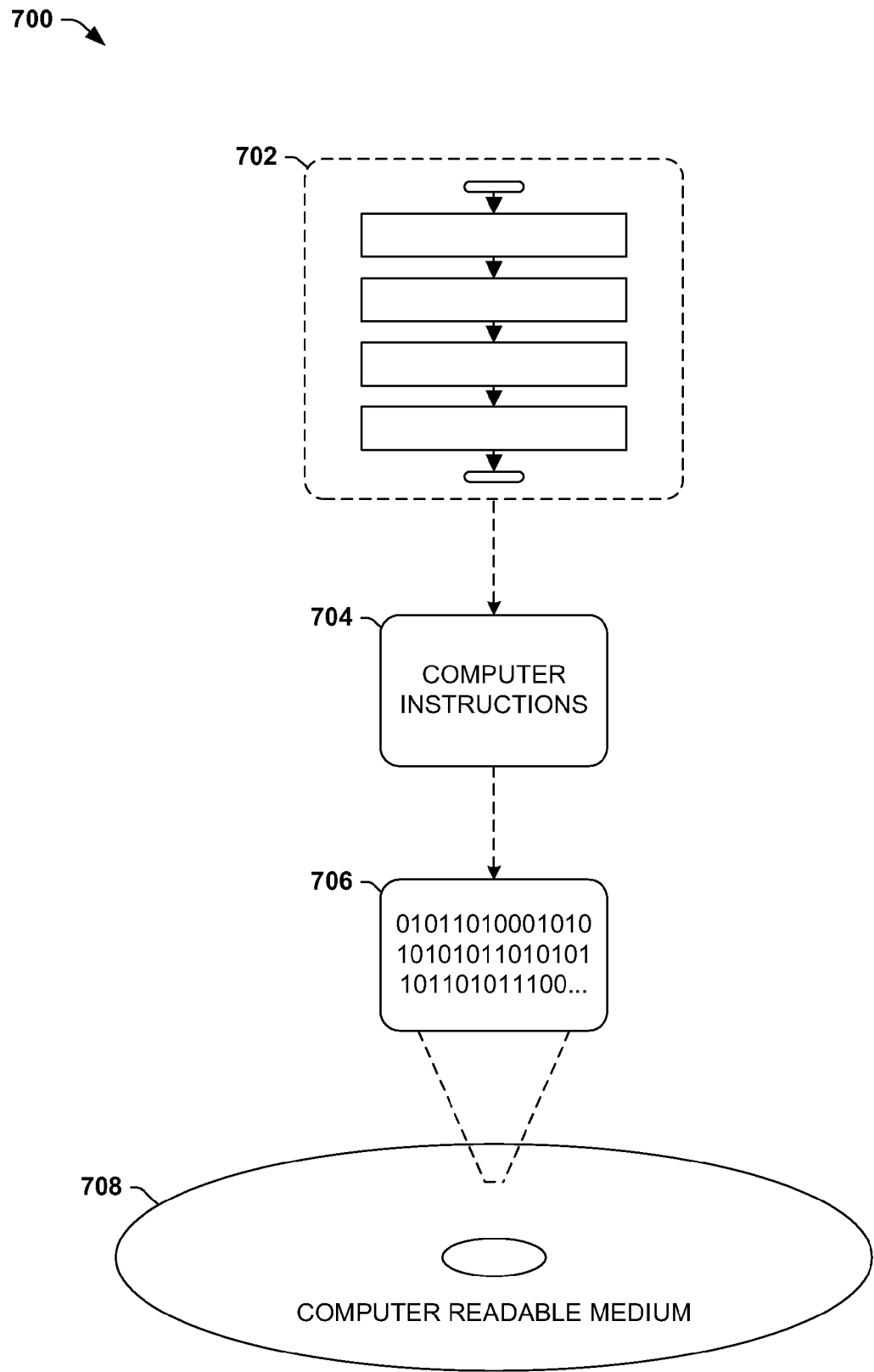
FIG. 7 is an illustration of an exemplary computer-readable medium comprising processor-executable instructions configured to embody one or more of the techniques provided herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to the principles set forth herein. In one such embodiment, the processor-executable instructions 704 may be configured to perform a method 702 for generating a multidimensional database query from a relational database query, such as the exemplary method 100 of FIG. 1, for example. Many such computer-readable media may be devised by those of ordinary skill in the art that are configured to operate in accordance with the techniques presented herein.

Figure 8:
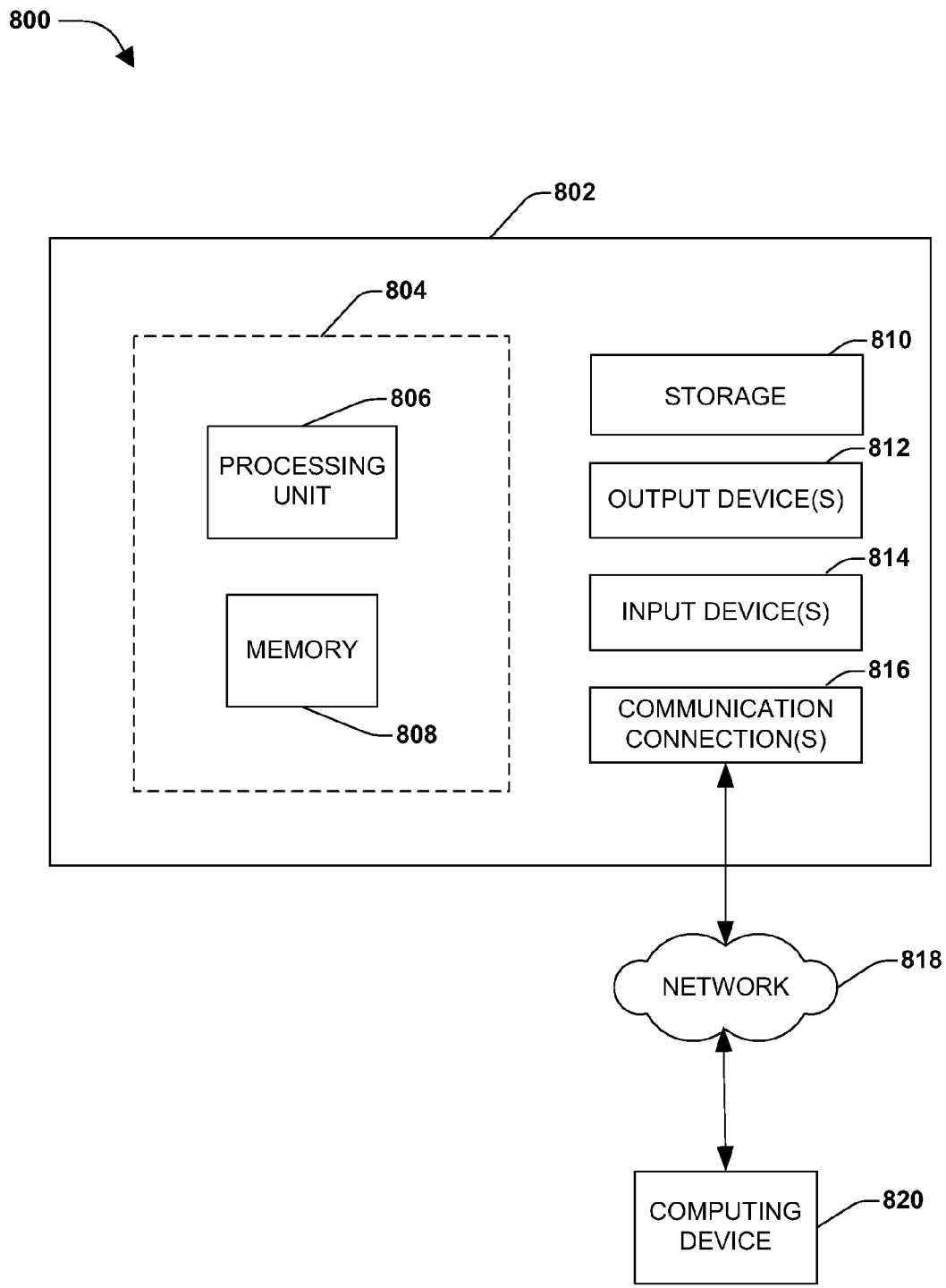
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 8394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for translating a relational database query into a multidimensional expression language (MDX) database query comprising:
    parsing a relational database query into one or more relational database query tokens;
    filtering zero or more of the one or more relational database query tokens based at least in part on business logic to create a set of filtered relational database query tokens, the filtering comprising:
    removing a relational database query token, from the one or more relational database query tokens, responsive to determining that the relational database query token corresponds to a field not supported by a multidimensional database and is associated with a return of a dataset that exceeds a threshold;
    identifying relevant metadata, from a metadata store, associated with metadata associated with the set of filtered relational database query tokens, the relevant metadata comprising current multidimensional metadata and trend related multidimensional metadata;
    translating at least some relational database query tokens of the set of filtered relational database query tokens into one or more work item query language (WIQL) tokens;
    retrieving a first group of one or more MDX tokens based at least in part on the relevant metadata;
    retrieving a second group of one or more MDX tokens based at least in part on the one or more WIQL tokens;
    arranging at least some of the one or more MDX tokens of the first group and at least some of the one or more MDX tokens of the second group based at least in part on the metadata associated with the set of filtered relational database query tokens; and
    generating one or more MDX database queries for trend related information and current information based at least in part on at least some of the arranged MDX tokens, at least some of the parsing, the filtering, the identifying, the translating, the retrieving a first group, the retrieving a second group, the arranging, and the generating implemented at least in part via a processing unit.

2. The method of claim 1, comprising arranging at least some of the one or more relational database query tokens into one or more buckets.

3. The method of claim 1, the relevant metadata based at least in part on one or more schemas.

4. The method of claim 1, the one or more MDX database queries comprising at least one of a first MDX query relating to current data or a second MDX query relating to historical data.

5. The method of claim 1, comprising arranging at least some of the one or more relational database query tokens into at least one of a first bucket corresponding to filter operators, a second bucket corresponding to filter criteria, a third bucket corresponding to filter fields, or a fourth bucket corresponding to results fields.

6. The method of claim 1, the relational database query associated with a structured query language.

7. The method of claim 1, the metadata store comprising metadata associated with at least one of a filter operator, a filter criteria, a filter field, or a result field.

8. The method of claim 1, the multidimensional database comprising an online analytical processing cube.

9. The method of claim 1, comprising flagging at least one of an error or a warning.

10. The method of claim 1, comprising customizing at least one of the one or more MDX database queries to generate a customized MDX database query that trims data retrieved from the multidimensional database.

11. A system for translating a relational database query into a multidimensional expression language (MDX) database query comprising:
    a component configured to:
    parse a relational database query into one or more relational database query tokens;
    filter zero or more of the one or more relational database query tokens based at least in part on business logic to create a set of filtered relational database query tokens, the filtering comprising:
    removing a relational database query token, from the one or more relational database query tokens, responsive to determining that the relational database query token corresponds to a field not supported by a multidimensional database or is associated with a return of a dataset that exceeds a threshold;
    identify relevant metadata, from a metadata store, associated with metadata associated with the set of filtered relational database query tokens, the relevant metadata comprising current multidimensional metadata and trend related multidimensional metadata;
    translate at least some relational database query tokens of the set of filtered relational database query tokens into one or more work item query language (WIQL) tokens;
    retrieve a first group of one or more MDX tokens based at least in part on the relevant metadata;
    retrieve a second group of one or more MDX tokens based at least in part on the one or more WIQL tokens;
    arrange at least some of the one or more MDX tokens of the first group and at least some of the one or more MDX tokens of the second group based at least in part on the metadata associated with the set of filtered relational database query tokens; and
    generate one or more MDX database queries for trend related information and current information based at least in part on at least some of the arranged MDX tokens.

12. The system of claim 11, the relevant metadata comprising at least one of one or more definitions of schema, one or more relationships between one or more tables and one or more columns, or data relating to how relational database data is pushed to the multidimensional database.

13. The system of claim 11, the multidimensional database comprising an online analytical processing cube.

14. The system of claim 11, the relational database query associated with a structured query language.

15. The system of claim 11, the business logic comprising at least one of a homogenous criteria or a heterogeneous criteria.

16. The system of claim 11, the component configured to flag at least one of an error or a warning.

17. A computer-readable storage device comprising computer-executable instructions, which when executed at least in part via a processor on a computer perform acts, comprising:
    parsing a relational database query into one or more relational database query tokens;
    filtering zero or more of the one or more relational database query tokens based at least in part on business logic to create a set of filtered relational database query tokens, the filtering comprising:

removing a relational database query token, from the one or more relational database query tokens, responsive to determining that the relational database query token at least one of corresponds to a field not supported by a multidimensional database or is associated with a return of a dataset that exceeds a threshold;

identifying relevant metadata, from a metadata store, associated with metadata associated with the set of filtered relational database query tokens, the relevant metadata comprising current multidimensional metadata and trend related multidimensional metadata;

translating at least some relational database query tokens of the set of filtered relational database query tokens into one or more work item query language (WIQL) tokens;

retrieving a first group of one or more multidimensional expression language (MDX) tokens based at least in part on the relevant metadata;

retrieving a second group of one or more MDX tokens based at least in part on the one or more WIQL tokens;

arranging at least some of the one or more MDX tokens of the first group and at least some of the one or more MDX tokens of the second group based at least in part on the metadata associated with the set of filtered relational database query tokens; and generating one or more MDX database queries for trend related information and current information based at least in part on at least some of the arranged MDX tokens.

18. The computer-readable storage device of claim 17, comprising arranging at least one of the one or more relational database query tokens into one or more buckets.

19. The computer-readable storage device of claim 17, the relational database query associated with a structured query language.

20. The computer-readable storage device of claim 17, the relevant metadata comprising at least one of one or more definitions of schema, one or more relationships between one or more tables and one or more columns, or data relating to how relational database data is pushed to the multidimensional database.

* * * * *